L. RODÉS.
ALTIMETER.
APPLICATION FILED JAN. 14, 1919.

1,404,062.

Patented Jan. 17, 1922.

INVENTOR.
Luis Rodés

ATTORNEYS

UNITED STATES PATENT OFFICE.

LUIS RODÉS, OF TORTOSA, SPAIN.

ALTIMETER.

1,404,062.  Specification of Letters Patent.  Patented Jan. 17, 1922.

Application filed January 14, 1919. Serial No. 271,105.

*To all whom it may concern:*

Be it known that I, LUIS RODÉS, of Tortosa, Spain, have invented certain new and useful Improvements in Altimeters; and I do hereby declare the following to be a full, clear, and exact description of the invention, such as will enable others skilled in the art to which it appertains to make and use the same.

My invention relates to devices for indicating and measuring variations in the force of gravity and also variations in physical conditions or factors which influence the force of gravity; more particularly, changes in altitude.

The objects of my invention are to provide means capable of indicating visibly and with clearness variations in the force of gravity and of physical factors causing such variations; to provide such indicating means responsive instantaneously to variations of gravity and capable of indicating transient and rapid variations of gravity; to provide such means wherein the indications of variations of gravity are quantitatively functional to the variations of gravity and may be utilized to measure said variations, and such other objects as will more fully hereinafter appear.

It is to be clearly understood that throughout the description, wherever the term "variations in the force of gravity" is used variations in physical factors causing variations in the force of gravity and more particularly of altitude are to be included within the meaning of the term.

I have found that variations in the force of gravity may be clearly and quantitatively indicated by causing a definite mass, the weight of which is determined by the value of the force of gravity, to exert pressure upon a volume of gas. Changes in the force of gravity cause changes in the weight of said mass and hence in the pressure exerted upon the volume of gas, causing corresponding changes therein which are directly transmitted to a sensitive and accurate indicating and measuring device.

In carrying out my invention I have found it desirable to utilize as a pressure exerting mass a body of a liquid of high specific gravity, such as mercury and to obviate the effect of variations of barometric pressure by keeping the volume of gas isolated from the atmosphere.

Figure 1:
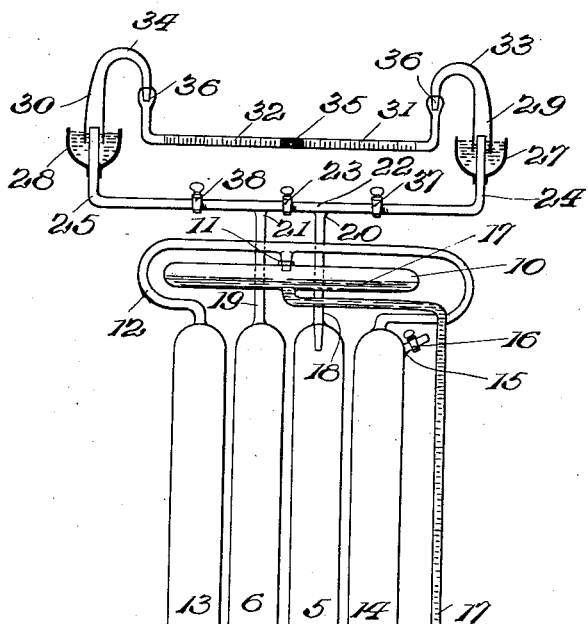
Figure 2:
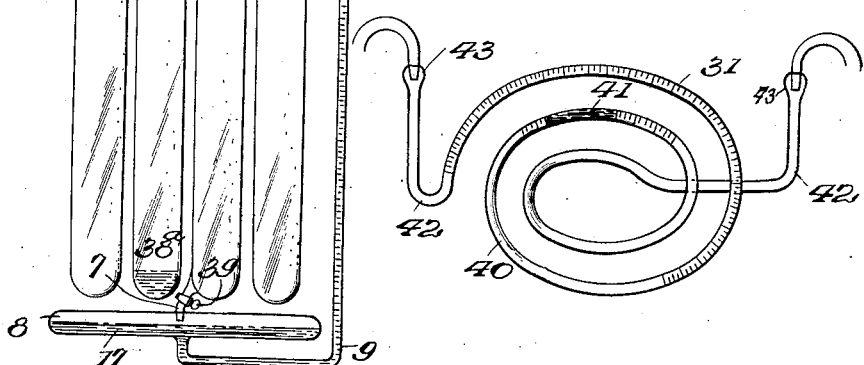

In the accompanying drawings, Figure 1 shows a form of construction in which I may embody my invention. Figure 2 shows a modified form of indicating device.

In the embodiment of my invention as illustrated in Figure 1 I may utilize two communicating receptacles 5 and 6, which I prefer to construct as glass cylinders, as containers for the enclosed body of gas subject to pressure. The element effecting communication between the cylinders 5 and 6, and which will be described in full hereinafter, may, as illustrated, include the device whereby changes in the volume of the body of gas are indicated and measured.

Receptacle 5 communicates through short tube 7 with the upper portion of a bulb or receptacle 8 preferably having relatively great horizontal dimensions. The lower portion of this bulb or receptacle 8 communicates by means of a bent tube 9 with the lower portion of an elevated bulb or receptacle 10, also preferably having relatively great horizontal dimensions. The upper part of bulb 10 is in communication through branch tube 11 with a tube 12 which connects two cylinders or containers 13 and 14. Cylinder 14 is provided with an outlet tube 15 in which is located a stopcock 16.

In the apparatus above described cylinders 5 and 6 with their connecting members and the upper part of bulb 8 serve as a container for a body of gas. A body or column of mercury 17, contained in the lower part of bulb 8 and filling the tube 9 and the lower part of bulb 10 exerts pressure upon this body of gas. The surface of the body of mercury in bulb 10, that is, the surface of the mercury not in contact with the above mentioned body of gas, is maintained under the constant pressure of the body of gas contained in the system including the upper part of bulb 10, tubes 11 and 12 and cylinders 13 and 14. This pressure may be controlled at will by exhaustion or compression through tube 15 and maintained by closing stop-cock 16.

It is apparent from the above that the body of gas in cylinders 5 and 6 and related passages is under a pressure equal to the weight of the column of mercury extending between the planes of the free surfaces of the mercury in bulb 10 and bulb 8 plus the pressure of the body of gas in cylinders 13 and 14 and related passages. It is also apparent that any variation in the force of gravity will cause a corresponding change in the weight of the column of mercury and in its height, which will result in a change in the pressure on the body of gas in cylinders 5 and 6 and related elements and a corresponding change in volume therein. I prefer that bulbs 8 and 10 have relatively great horizontal dimensions so that any change in level of the mercury will be accompanied by a relatively great transfer of volume thereof.

The connections between cylinders 5 and 6 are preferably as follows:

Tubes 18 and 19 extend respectively from cylinders 5 and 6 and open at different points 20 and 21, respectively, into a connecting tube 22. Between points 20 and 21 is provided a stop-cock 23. The ends 24 and 25 of tube 22 may extend vertically upward, terminating in approximately the same vertical plane and being provided with cups 27 and 28 respectively. These cups serve for the reception of a liquid such as mercury and into them fit the downwardly extending ends 29, and 30, respectively, of a measuring tube 31. These ends form parts of the inverted U's 33—34 at the ends of measuring tube 31 and extend over the vertically extending ends 24 and 25 respectively of tube 22 and into cups 27 and 28. A gas tight connection between measuring tube 31 and tube 22 is then effected.

The graduated portion 32 of measuring tube 31 is of capillary dimensions and it is provided at its ends with expansions 36 with which are respectively connected one leg of the inverted U-shaped members 33 and 34. A drop of liquid 35 such as alcohol, oil or ether, is contained within the graduated portion 32 of the measuring tube and serves as the indicator. Expansions 36 of the tube 31 prevent passage of the indicating liquid over the U. Stop-cocks 37 and 38 are respectively located in tube 22 between the points 20 and 21 and the corresponding ends of the tube and these stop cocks with the stop cock 39 in tube 7 may be used to completely isolate the indicating tube and thus protect it against oscillations of mercury in carrying the instrument from one place to another.

In the normal use of the instrument it is suspended so that the column of mercury is in a vertical position and air is exhausted from cylinders 13 and 14 through tube 15, which is closed by stop-cock 16 when the pressure in said cylinders is at a convenient value, such as will, for example, maintain the mercury column at a suitable level in bulbs 8 and 10. By manipulation of stop-cocks 37 and 38 the indicator or drop of liquid 35 may be brought to a position of equilibrium in the capillary measuring tube 31, stop-cock 23 being closed. The latter may then be opened to equalize the gas pressure in cylinders 5 and 6, and again closed for use of the instrument. If the instrument is then brought to a higher altitude, whereby the force of gravity acting upon the mass of mercury is reduced, and suspended in the same position, the resulting reduction in weight of the mercury has its influence on the gas in cylinders 5 and 6 causing a reduction in pressure in these cylinders, the gas pressure in cylinders 13 and 14 being unchanged. The reduction in pressure on the gas in cylinders 5 and 6 causes a corresponding increase in its volume, and this increase causes a movement of the drop of liquid 35 in the tube 31 proportional to the change in volume of the gas. It is, of course, necessary that accurate readings of the temperature of the instrument be made and corresponding corrections made in accordance with the well known laws of gases.

To compensate for any volumnar changes in the body of mercury a quantity of mercury 38$^a$ may be placed in tube 6, being introduced through the open end of the portion 25 of the tube 22, the stop cock 38 being opened and the stop cock 23 closed.

It is to be noted that the tubes 7, 11 and 18 at their respective connections with the bulbs 8 and 10 and cylinder 5 are contracted and thus prevent sudden passing of the gas due to oscillations of the mercury with consequent change of the indicator.

Figure 2 illustrates a measuring device which I may use in cases in which a greater range of graduations is necessary. In this form the indicator tube may be a long capillary tube 40 coiled into a spiral and containing the indicator liquid 41. At each end of the measuring tube an inverted U-shaped member 42 is provided, in the upwardly extending leg of which an expanded member 43 is provided and the downwardly extending leg of which is adapted to communicate with the remainder of the instrument through a suitable gas tight connection, for example, by means of liquid seals, such as 27 and 28 in Figure 1.

It is readily apparent that the indicating device of the instrument is instantaneously responsive to variations in the force of gravity, temperature being constant, and that where temperature is not constant its effect may be readily determined and a proper allowance made with great accuracy. The device may hence be used not only for the measurement of altitudes but also for measuring variations in the force of gravity at a determined place, whether due to seismological disturbances, astronomic phenomena, or other causes, known or unknown, and for measuring changes in physical factors causing changes in the force of gravity.

I claim as my invention:

1. In a device of the class described, two containers for a volume of gas, a capillary tube connecting said containers, a mobile drop of liquid in the capillary tube, means for exerting pressure on the gas in one of said containers, and a valved by-pass between said containers for equalizing the pressure therein.

2. In a device of the class described, two containers for a volume of gas, said containers being of approximately the same capacity, a capillary tube joining said containers, a mobile drop of liquid in said capillary tube, a valved by-pass between said containers for equalizing the pressure therein, a receptacle communicating with one of said containers, a second receptacle at a level above said containers, means for connecting said receptacles, a body of mercury in said receptacles and connecting means exerting pressure upon the gas in said containers, and a valve-controlled gas-tight receptable communicating with the higher mercury containing receptacle.

In testimony whereof I have signed this specification.

LUIS RODÉS.